United States Patent
Cebry

(10) Patent No.: US 7,327,178 B2
(45) Date of Patent: Feb. 5, 2008

(54) TIMING CONTROL CIRCUIT FOR LOSSLESS SWITCHING CONVERTER

(75) Inventor: George L. Cebry, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 225 days.

(21) Appl. No.: 11/239,881

(22) Filed: Sep. 30, 2005

(65) Prior Publication Data

US 2007/0076458 A1    Apr. 5, 2007

(51) Int. Cl.
*H03K 3/00* (2006.01)
(52) U.S. Cl. .................... 327/291; 291/293; 291/392; 291/401; 363/15; 363/21.1; 363/21.11
(58) Field of Classification Search ................ None
See application file for complete search history.

(56) References Cited

U.S. PATENT DOCUMENTS

| | | | |
|---|---|---|---|
| 6,388,896 B1 | 5/2002 | Cuk | |
| 6,462,962 B1 | 10/2002 | Cuk | |
| 6,504,739 B2 * | 1/2003 | Phadke | 363/127 |
| 7,158,392 B2 * | 1/2007 | Hosokawa et al. | 363/21.06 |
| 2007/0097714 A1 * | 5/2007 | Cebry | 363/21.06 |

* cited by examiner

*Primary Examiner*—Kenneth B. Wells
*Assistant Examiner*—An T. Luu

(74) *Attorney, Agent, or Firm*—Ingrassia Fisher & Lorenz

(57) ABSTRACT

A timing control circuit (70) generates staggered signals from a pulse width modulated signal (68) providing lossless switching in a DC to DC power converter (10). The DC to DC power converter (10) comprises two input MOSFET switches (22, 28) coupled to primary windings (34) of an isolation transformer (36) and two output MOSFET switches (38, 50) coupled to secondary windings (48) of the isolation transformer. The timing circuit (70) comprises an input terminal (90) for receiving a pulse width modulated signal (68) that switches low at time t1 and high at time t4. A first timing output signal circuit (92) is responsive to the pulse width modulated signal (68) and provides a first timing output signal (72) that switches low at time t1 and high at time t7 to control one of the input MOSFET switches (22). A second timing output signal circuit (94) is responsive to the pulse width modulated signal (68) and provides a second timing output signal (76) that switches high at time t3 and low at time t6 to control the other input MOSFET switch (28). A third timing output signal circuit (96) is responsive to the pulse width modulated signal (68) and provides a third timing output signal (82) that switches low at time t2 and high at time t5 to control one of the output MOSFET switches (50). A fourth timing output signal circuit (98) is responsive to the pulse width modulated signal (68) and provides a fourth timing output signal (86) that switches high at time t2 and low at time t8 to control the other of the output MOSFET switches (38). The times t1 through t8 occur in sequence.

16 Claims, 3 Drawing Sheets

TIMING CONTROL CIRCUIT FOR LOSSLESS SWITCHING CONVERTER

FIELD OF THE INVENTION

The present invention generally relates to a timing control circuit, and more particularly to a timing control circuit for a DC to DC power converter having lossless switching.

This invention was made with Government support under Agreement No. LES76BT476 awarded by Raytheon. The Government has certain rights in this invention.

BACKGROUND OF THE INVENTION

DC to DC converters change DC electrical power from one voltage level to another. Examples include stepping 24 volts DC from a truck battery down to 12 volts DC for a car radio, stepping 5 volts DC on a computer mother board down to a lower DC voltage for an integrated circuit, and stepping 1.5 volts DC from a battery up to a higher voltage to operate electronic circuitry. DC to DC converters also may be used to provide noise isolation, power bus regulation, etc. Naturally, it is desired for this conversion of voltages to be efficient. Energy consumed by the circuitry and components of the converter have a negative impact on this efficiency.

There are various types of DC to DC converters including the "buck", "boost", "buck-boost", and "Cuk". While the "buck" and "boost". step the voltage down and up, respectively, the "buck-boost" and "Cuk" may step the voltage in either direction.

Many improvements have been made to these DC to DC converters in recent years with improved conversion efficiency and reduced size. However, an increasing demand for reduced size electronic signal processing equipment requires smaller size and less weight of electronic power processing equipment. This results in increased switching frequency at which DC to DC switching converters operate and therefore, proportionally increased switching power losses.

One version of the "Cuk" converter described in U.S. Pat. No. 6,388,896, includes a lossless DC to DC converter having high efficiency and elimination of switching losses enabling a high switching frequency with reduction of converter size and weight. While this "Cuk" converter describes a timing sequence for signals to switch transistors disclosed therein, there is no mention of the timing control circuit used to generate these signals.

Accordingly, it is desirable to provide a timing control circuit for a DC to DC power converter having lossless switching. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A timing control circuit generates staggered signals from a pulse width modulated signal providing lossless switching in a DC to DC power converter. The DC to DC power converter comprises two MOSFET switches coupled to primary windings of an isolation transformer and two output MOSFET switches coupled to secondary windings of the isolation transformer. The timing circuit comprising an input terminal for receiving a pulse width modulated signal that switches low at time t1 and high at time t4. A first timing output signal circuit is responsive to the pulse width modulated signal and provides a first timing output signal that switches low at time t1 and high at time t7 to control one of the input MOSFET switches. A second timing output signal circuit is responsive to the pulse width modulated signal and provides a second timing output signal that switches high at time t3 and low at time t6 to control the other of the input MOSFET switches. A third timing output signal circuit is responsive to the pulse width modulated signal and provides a third timing output signal that switches low at time t2 and high at time t5 to control one of the output MOSFET switches. A fourth timing output signal circuit is responsive to the pulse width modulated signal and provides a fourth timing output signal that switches high at time t2 and low at time t8 to control the other of the output MOSFET switches. The times t1 through t8 occur in sequence.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A timing control circuit is disclosed that staggers signals from a pulse wave modulated signal providing lossless switching in a DC to DC power converter. The DC to DC power converter comprises a power processing stage with four MOSFET switches (input, complementary input, output, complementary output), an isolation transformer, input and output inductors, series input capacitor, and an auxiliary capacitor. The input inductor is connected in series with a DC source (a continuous input current). The input capacitor is coupled in series between the input inductor and a transformer primary. The output inductor is connected in series to the load and provides a continuous output current. The input and complementary input switches are coupled on the transformer's primary side while the output and complementary output switches are coupled on the transformer's secondary side. The series coupled complementary input switch and auxiliary capacitor conduct an AC ripple current when the complementary input and output switches are closed.

This AC ripple current and the output MOSFET switch is operated with a switching sequence and time control which enables efficient lossless switching. A resonance current is created between parasitic capacitances of the input and complementary input switches and the leakage inductance of the isolation transformer and the timing sequence of the four switches. This resonance (current) forces the voltage across the input switch to zero volts prior to turning the input switch on. The input switch is then turned on at zero volts, so there is no power loss. This provides switching with significantly reduced losses.

An exemplary embodiment of the timing control circuit of the present invention includes four timing output signal circuits wherein each provide a timing output signal with pulses having a rise and fall sequenced in relation to the rise and fall of the other three timing output pulsed signals.

Figure 1:
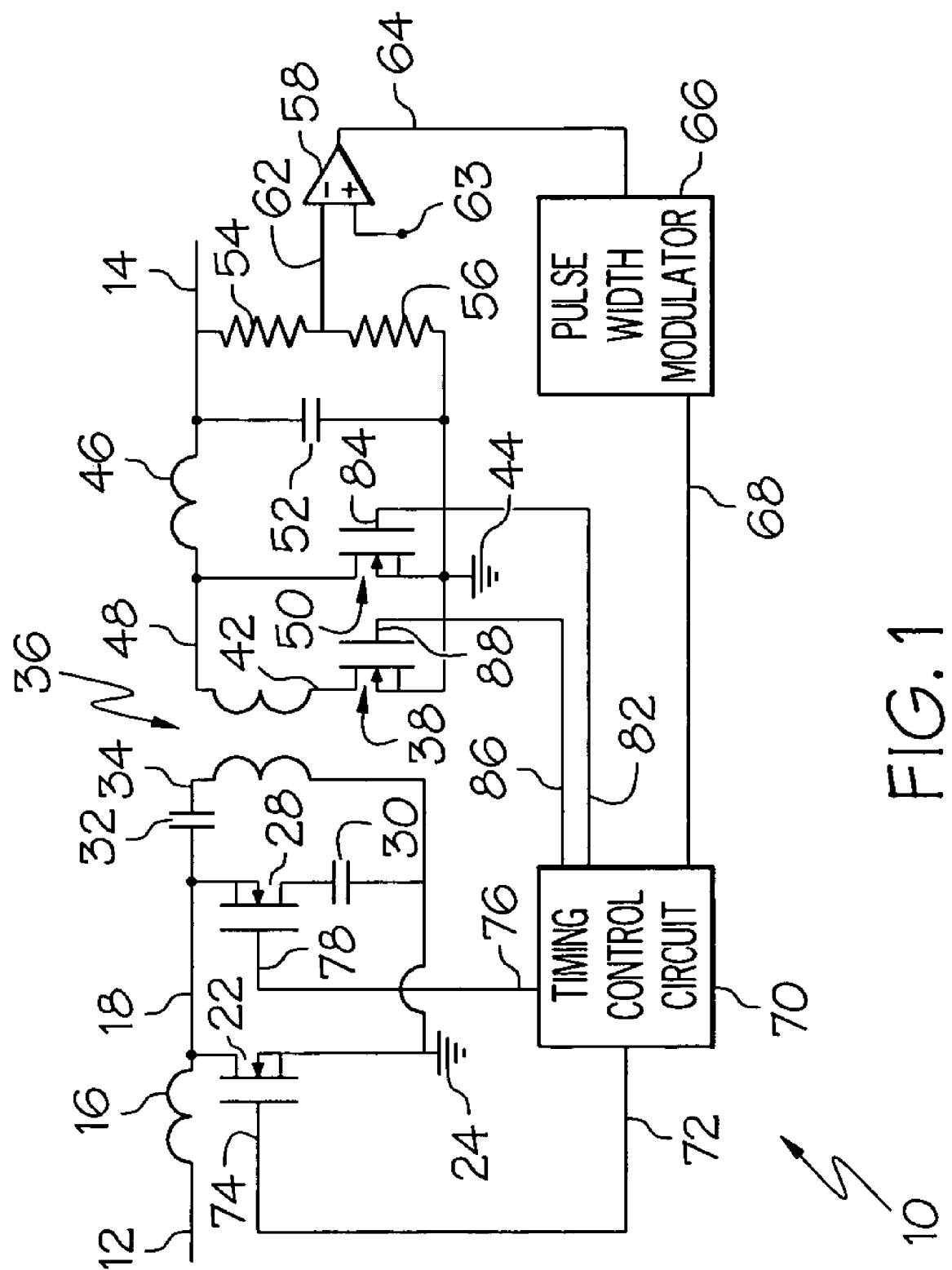
FIG. 1 is a partial schematic of a DC to DC power converter in accordance with an exemplary embodiment.

A DC to DC power converter 10 of FIG. 1 includes an input terminal 12 and an output terminal 14. A DC voltage is applied to input terminal 12 and a converted DC voltage is provided as an output from output terminal 14. An input inductor 16 is coupled between input terminal 12 and node 18. An input MOSFET switch 22 has a drain connected to the node 18 and a source connected to a node 24, e.g., a first ground reference. A complementary input MOSFET switch 28 has a source connected to the node 18 and a drain connected to the auxiliary capacitor 30. A series input capacitor 32 is coupled between the node 18 and a terminal 34 of an isolation transformer 36. A complementary output MOSFET switch 38 has a drain connected to a terminal 42 of the isolation transformer 36 and a source connected to node 44. An output inductor 46 is coupled between a terminal 48 of the isolation transformer 36 and the output terminal 14. An output MOSFET switch 50 has a drain connected to the terminal 48 and a source connected to node 44. An output capacitor 52 is coupled between the output terminal 14 and the node 44. Resistors 54 and 56 are coupled in series between the output terminal 14 and the node 44. An error amplifier 58 has an input terminal 62 coupled between resistors 54 and 56 for comparison with voltage reference 63, and an output terminal 64 connected to a pulse width modulator 66.

The pulse width modulator 66 provides a pulse width modulated (PWM) signal 68 to the timing control circuit 70. The timing control circuit 70 provides a first output signal 72 to a control gate 74 of input MOSFET switch 22, a second output signal 76 to a control gate 78 of complementary input MOSFET switch 28, a third output signal 82 to a control gate 84 of output MOSFET switch 50, and a fourth output signal 86 to a control gate 88 of complementary output MOSFET switch 38. Optionally, output MOSFET switches 38 may comprise a diode; therefore, the fourth output signal 86 would not be required. Also, optionally, output MOSFET switche 50 may comprise a diode; therefore, the third output signal 82 would not be required.

When input MOSFET switch 22 is turned on and complementary input MOSFET switch 28 is turned off, current flows into MOSFET switch 22 from the input terminal 12 through input inductor 16 and from the series combination of capacitor 32 and the primary of isolation transformer 36. When input MOSFET switch 22 is turned off, the voltage across the input inductor 16 reverses to maintain a current flow. This current then flows through complementary input MOSFET switch 28 and the series combination of input capacitor 32 and the primary of isolation transformer 36. During this time, energy is transferred from the primary to the secondary of isolation transformer 36 to the output terminal 14, with output inductor 46 and output capacitor 52 acting as a smoothing filter. When complementary input MOSFET switch 28 turns off, input MOSFET switch 22 is turned on again, the cycle repeats.

Figure 2:
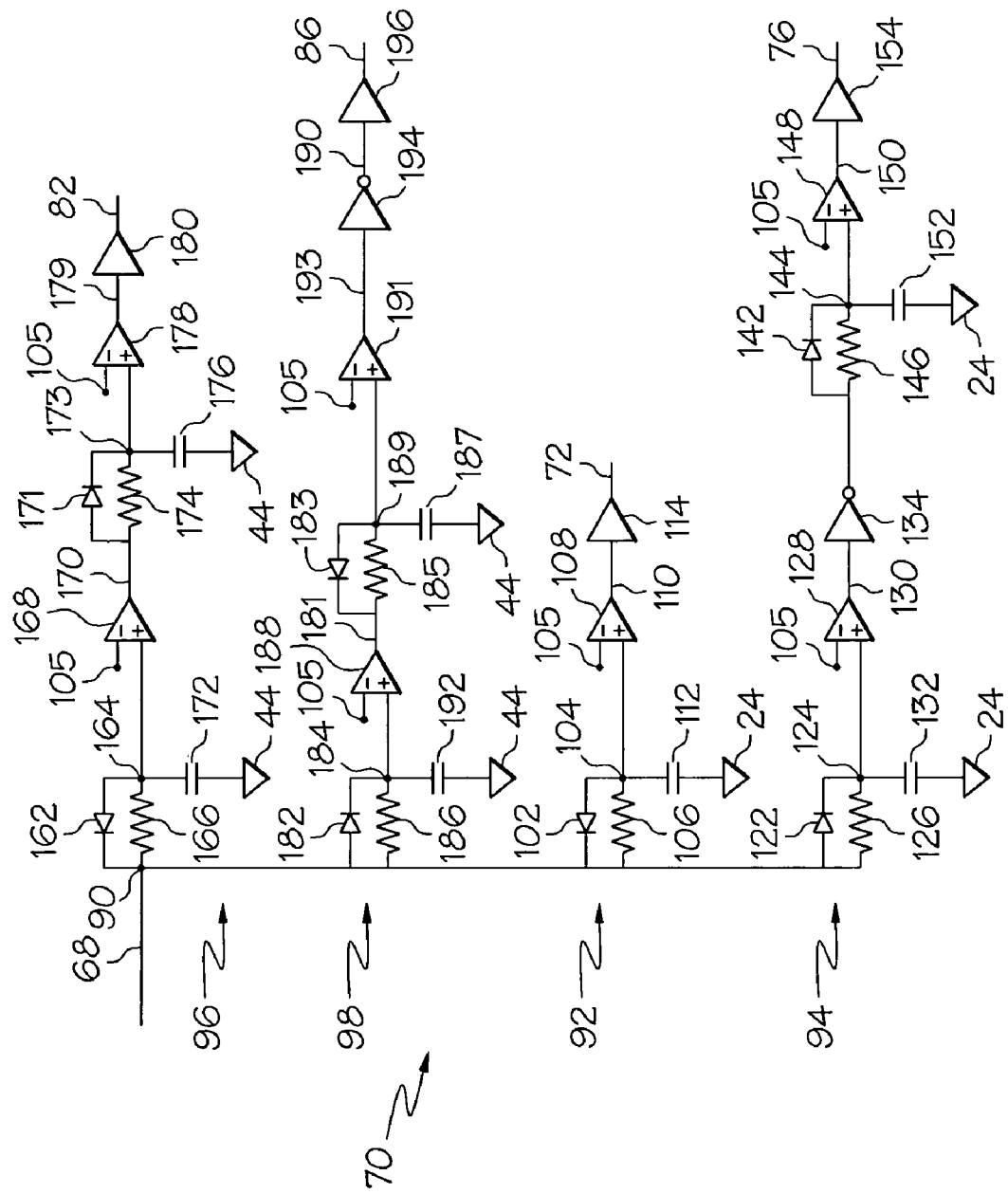
FIG. 2 is schematic of an exemplary embodiment.

Referring to FIG. 2 and in accordance with an exemplary embodiment of the present invention, the timing control circuit 70 receives the PWM signal 68 at a node 90 for supplying the PWM signal 68 to four output signal circuits 92, 94, 96, and 98 which provide the output signals 72, 76, 82, and 86, respectively. The four output signal circuits 92, 94, 96, and 98 may be isolated from the PWM signal 68 with a transformer, opto-coupler, or other isolation device (not shown). Furthermore, a separate PWM signal (not shown) for each output signal circuit 92, 94, 96, and 98 may be provided in lieu of the PWM signal 68.

The output signal circuit 92 comprises a diode 102 having a cathode connected to node 90 and an anode connected to node 104, and a resistor 106 coupled between nodes 90 and 104. Comparator 108 has it's positive input coupled to node 104, it's negative input coupled to node 105, and an output 110 connected to the input of first MOSFET driver 114, whose output provides output signal 72. A capacitor 112 is coupled between node 104 and node 24.

In operation, output signal circuit 92 receives the PWM signal 68 at node 90. When the PWM signal goes high, the signal goes through resistor 106 and capacitor 112, providing a time delay. Comparator 108 is set to not provide an output signal until a specified voltage level is reached defined by the reference voltage on node 105. When the PWM signal 68 goes low, the signal goes through diode 102, bypassing resistor 106 and no time delay occurs.

The output signal circuit 94 comprises a diode 122 having an anode connected to node 90 and a cathode connected to node 124, and a resistor 126 coupled between nodes 90 and 124. Comparator 128 has it's positive input coupled to node 124, it's negative input coupled to node 105 and an output 130 connected to an input of inverter 134. A capacitor 132 is coupled between node 124 and node 24. A diode 142 has an anode connected to the output of inverter 134 and a cathode connected to node 144, and a resistor 146 coupled between the output of comparator 134 and node 144. Comparator 148 has it's positive input coupled to node 144, it's negative input coupled to node 105 and an output 150 connected to the input of MOSFET driver 154, whose output provides output signal 76. A capacitor 152 is coupled between node 144 and node 24.

In operation, output signal circuit 94 receives the PWM signal 68 at node 90. When the PWM signal goes high, the signal goes through diode 122, bypassing resistor 126, and no time delay occurs. When the PWM signal goes low, the resistor 126 and capacitor 132 provide a time delay. Comparator 128 is set to not provide output signal 130 until a specified voltage level is reached defined by reference voltage on node 105. Inverter 134 inverts the output 130. When the signal from comparator 134 is low (output 68 is high), the signal goes through resistor 146 and capacitor 152 providing a time delay. When the signal from inverter 134 is high (output 68 is low), the signal goes through diode 142, bypassing resistor 146, and no time delay occurs. Comparator 148 is set to not provide output signal to the input of MOSFET driver 154 until a specified voltage level is reached defined by reference voltage on node 105.

The output signal circuit 96 comprises a diode 162 having a cathode connected to node 90 and an anode connected to node 164, and a resistor 166 coupled between nodes 90 and 164. Comparator 168 has it's positive input coupled to node 164, it's negative input coupled to node 105 and provides an output signal 170. A capacitor 172 is coupled between node 164 and node 44. A diode 171 has an anode connected to the output 170 and a cathode connected to node 173. A resistor 174 is coupled between the output 170 and node 173, and a capacitor 176 is coupled between nodes 173 and 44. A comparator 178 has its positive input connected to node 173, its negative input connected to node 105, and its output connected to MOSFET driver 180 for providing output signal 82.

In operation, output signal circuit 96 receives the PWM signal 68 at node 90. When the PWM signal goes high, the resistor 166 and capacitor 172 provide a time delay. When the PWM signal 68 goes low, the signal goes through diode 162, bypassing resistor 166 and no time delay occurs. Comparator 168 is set to not provide output 170 until a specified voltage level is reached defined by the reference voltage on node 105. When the output signal 170 of comparator 168 goes low, the signal goes through resistor 174 and capacitor 176 and provides a time delay. When the output signal 170 of comparator 168 goes high, the signal goes through diode 171, bypassing resistor 174 and no time delay occurs. Comparator 178 is set to not provide an output to MOSFET driver 180 until a specified voltage level is reached defined by the reference voltage on node 105. The output of comparator 178 is connected to MOSFET driver 180, providing output signal 82.

The output signal circuit 98 comprises a diode 182 having an anode connected to node 90 and a cathode connected to node 184, and a resistor 186 coupled between nodes 90 and 184. A capacitor 192 is coupled between node 184 and node 44. Comparator 188 has it's positive input coupled to node 184, it's negative input coupled to node 105 and an output connected to node 181. A diode 183 has a cathode connected to node 181 and an anode connected to node 189. A resistor 185 is coupled between nodes 181 and 189. A capacitor 187 is coupled between nodes 44 and 189. A comparator 191 has it's positive input coupled to node 189 and a negative input coupled to node 105. The inverter 194 is connected between the output 193 of comparator 191 and the input of MOSFET driver 196. The output of MOSFET driver 196 provides output signal 86.

In operation, output signal circuit 98 receives the PWM signal 68 at node 90. When the PWM signal goes high, the signal goes through diode 182, bypassing resistor 186, and no time delay occurs. When the PWM signal goes low, the signal goes through resistor 186 and capacitor 192, providing a time delay. Comparator 188 is set to not provide an output signal at node 181 until a specified voltage level is reached defined by the reference voltage on node 105. When the signal at node 181 goes high, the signal goes through resistor 185 and capacitor 187 providing a time delay. When the signal at node 181 goes low, the signal goes through diode 183, bypassing resistor 185 and no time delay occurs. The output 193 of comparator 191 is set to not provide an output signal to the input of inverter 194 until a specified voltage level is reached as defined by the reference voltage on node 105. Inverter 194 inverts the output of comparator 191 at node 190 and provides an output to MOSFET driver 196 which provides fourth output signal 86.

Figure 3:
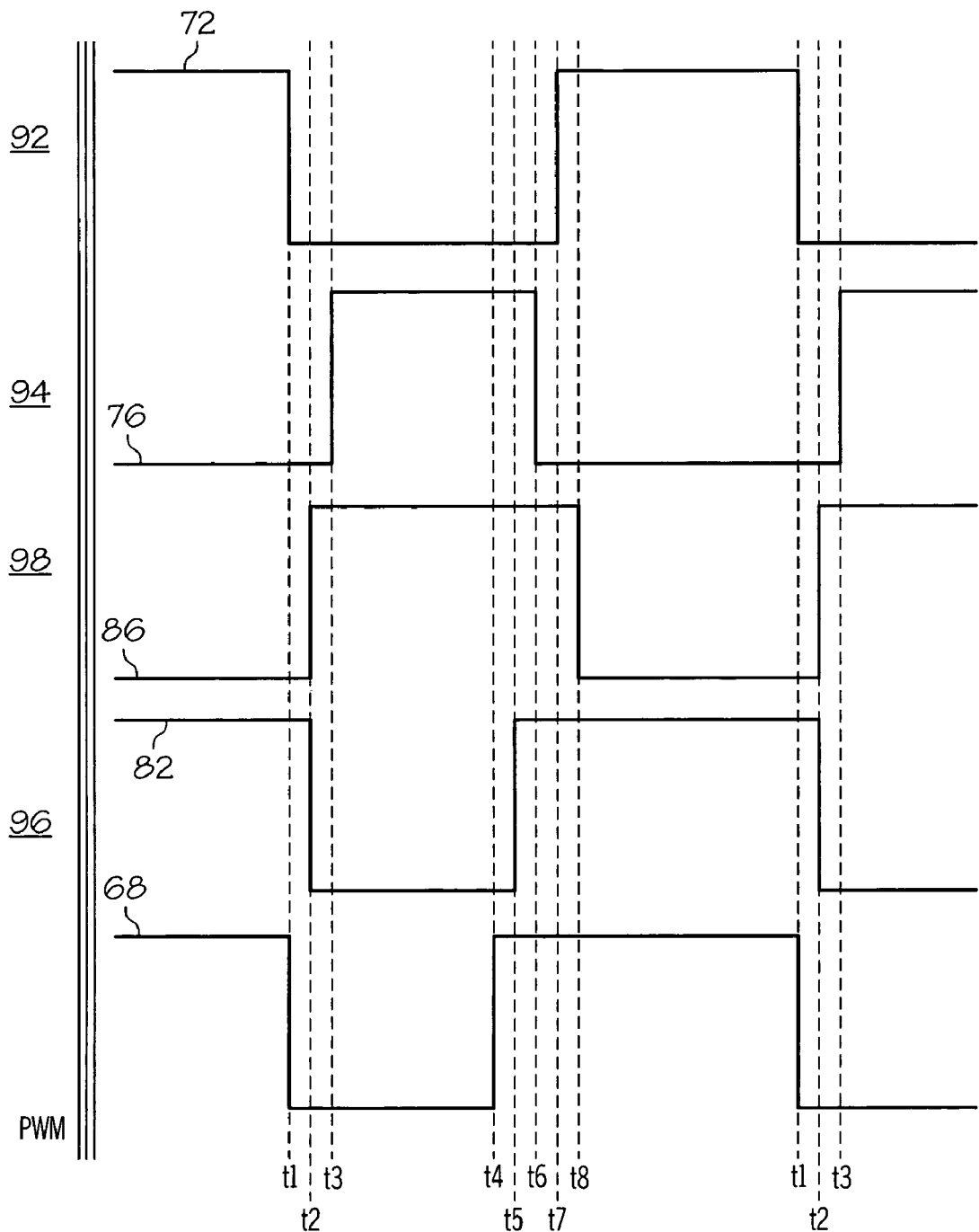
FIG. 3 is timing diagram of the exemplary embodiment of FIG. 2.

Referring to FIG. 3, the timed sequence is shown for PWM signal 68 and pulsed output signals 72, 76, 82, 86. It is the sequence of these output signals 72, 76, 82, 86 switching field effect transistors 22, 28, 50, 38, respectively, that leads to the lossless switching of the converter 10. In the exemplary embodiment, the capacitors 112, 132, 152, 172, 192, 176, 187 have a capacitance of 100 picofarads. Resistors 106, 126 have a resistance of 1000 ohms, resistor 146 has a value of 500 ohms, resistor 166 has a value of 200 ohms, resistor 174 has a value of 600 ohms, resistor 186 has a value of 600 ohms and resistor 185 has a resistance of 1200 ohms. These values, while important in a relationship sense, may be different values in other embodiments as long as the timing of the switching of the output signals 72, 76, 82, 86 remains as disclosed herein.

When the PWM signal 68 goes low at time t1, the output signal 72 will go low without delay as any charge on capacitor 112 is discharged relatively quickly through diode 102.

At time t2, the output signal 86 will go high. The output signal 86 is inverted by inverter 190 and delayed from the PWM signal 68 by the RC time constant provided by resistor 186 and capacitor 192 (diode 182 blocks the current). Also at time t2, the output signal 82 will go low, being delayed from output signal 68 by the RC time constant provided by resistor 174 and capacitor 176.

At time t3, the output signal 76 will go high, being inverted by inverter 134 and being delayed by the RC time constant provided by resistor 126 and capacitor 132.

At time t4, the PWM signal 68 goes high, without immediately causing any of the output signals to change.

At time t5, the output signal 82 goes high, with the delay being caused by the RC time constant of resistor 166 and diode 172.

At time t6, the output signal 76 goes low, being inverted by inverter 134 and the delay being caused by the RC time constant of resistor 146 and capacitor 152.

At time t7, the output signal 72 goes high, the delay being caused by the RC time constant of resistor 106 and capacitor 112.

At time t8, output signal 86 goes low, being inverted by inverter 194 and the delay being caused by the resistor 185 and capacitor 187.

Thus, four pulsed signals are provided having their rise and fall times sequenced to operate the input, complementary input, output, and complementary output MOSFET switches of the DC to DC converter in a lossless manner by creating a resonance between parasitic capacitances of the input and complementary input switches 22, 28 and the leakage inductance of the isolation transformer 36. Minor changes in the timing of rise and fall times of the output signals 72, 76, 82, 86 relative to the PWM signal 68 can be made in order to obtain the most efficient timed sequence. An example of a minor change would be to adjust the timing delay to have output signal 82 switch low anywhere between t1 and t3.

Variations to the embodiment include but are not limited to the following: 1) For better noise immunity, hystersis can be placed around each of the comparators 108, 128, 148, 168, 178, 188, 191. 2) One or more of the comparators 108, 128, 148, 168, 178, 188, 191 can be replaced with a logic non-inverter gate or equivalent. Different logic families would control the RC time delayed base on the logic family high and low switching thresholds. When the term "comparator" is used herein, it is understood that it may comprise include logic families. 3) All plated through hole parts, all surface mount parts, or a combination of both may be used. 4) The embodiment can be created with a custom IC, custom hybrid, custom gate array, or other custom implementation. 5) The embodiment can be used with or without MOSFET drivers 114, 154, 180, 196. 6) The input and/or output of the MOSFET drivers 114, 154, 180, 196 may be isolated from the output signal circuits 92, 94, 96, 98 with a transformer, opto-coupler, or other isolation device (not shown). 7) Each MOSFET driver 114, 154, 180, 196 can drive one or more MOSFETs.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A timing circuit for a DC to DC converter having two MOSFET switches coupled to primary windings of an isolation transformer and two output MOSFET switches coupled to secondary windings of the isolation transformer, the timing circuit comprising:
   an input terminal for receiving a pulse width modulated signal that switches low at time t1 and high at time t4;
   a first timing output signal circuit responsive to the pulse width modulated signal and providing a first timing output signal that switches low at time t1 and high at time t7 to control one of the input MOSFET switches;
   a second timing output signal circuit responsive to the pulse width modulated signal and providing a second timing output signal that switches high at time t3 and low at time t6 to control the other of the input MOSFET switches;
   a third timing output signal circuit responsive to the pulse width modulated signal and providing a third timing output signal that switches low at time t2 and high at time t5 to control one of the output MOSFET switches; and
   a fourth timing output signal circuit responsive to the pulse width modulated signal and providing a fourth timing output signal that switches high at time t2 and low at time t8 to control the other of the output MOSFET switches, wherein the times t1 through t8 occur in sequence.

2. The timing circuit of claim 1 wherein the pulse width modulated signal is taken from an output of the DC to DC converter.

3. The timing circuit of claim 1 wherein the first timing output signal circuit comprises:
   a first resistor coupled between the input terminal and a first node;
   a first diode having a cathode connected to the input terminal and an anode connected to the first node;
   a first capacitor coupled between the first node and a first voltage reference; and
   a first comparator having a positive input connected to the first node, having a negative input connected to a second voltage reference, and an output providing the first timing output signal.

4. The timing circuit of claim 3 wherein the second timing output signal circuit comprises:
   a second resistor coupled between the input terminal and a second node;
   a second diode having an anode connected to the input terminal and a cathode connected to the second node;
   a second capacitor coupled between the second node and the first voltage reference; and
   a second comparator having a positive input connected to the second node and a negative input connected to the second voltage reference;
   a first inverter having an inverting input connected to an output of the second comparator;
   a third resistor coupled between the output of the first inverter and a third node;
   a third diode having an anode connected to the output of the first inverter and a cathode connected to the third node; and
   a third capacitor coupled between the third node and the first voltage reference; and
   a third comparator having a positive input connected to the third node, a negative input connected to the second voltage reference, and an output providing the second timing output signal.

5. The timing circuit of claim 4 wherein the third timing output signal circuit comprises:
   a fourth resistor coupled between the input terminal and a fourth node;
   a fourth diode having a cathode connected to the input terminal and an anode connected to the fourth node;
   a fourth capacitor coupled between the fourth node and a third voltage reference; and
   a fourth comparator having a positive input connected to the fourth node and a negative input connected to the second voltage reference;
   a fifth resistor coupled between an output of the fourth comparator and a fifth node;
   a fifth diode having an anode connected to the output of the fourth comparator and a cathode connected to the fifth node;
   a fifth capacitor coupled between the fifth node and the third voltage reference; and
   a fifth comparator having a positive input connected to the fifth node, a negative input connected to the second voltage reference, and an output providing the third timing signal.

6. The timing circuit of claim 5 wherein the fourth timing output signal circuit comprises:
   a sixth resistor coupled between the input terminal and a sixth node;
   a sixth diode having an anode connected to the input terminal and a cathode connected to the sixth node;
   a sixth capacitor coupled between the sixth node and the third voltage reference; and
   a sixth comparator having a positive input connected to the sixth node and a negative input connected to the second voltage reference;
   a seventh resistor coupled between the output of the sixth comparator and a seventh node;
   a seventh diode having a cathode connected to the output of the sixth comparator and an anode connected to the seventh node;
   a seventh capacitor coupled between the seventh node and the third voltage reference;
   a seventh comparator having a positive input connected to the seventh node and a negative input connected to the second voltage reference; and
   a second inverter coupled to an output of the seventh comparator for providing the fourth timing output signal.

7. The timing circuit of claim 6 wherein the resistances of the first through seventh resistors and the capacitances of the first through seventh capacitors comprise values providing desired temporal spacing between each of times t1-t8.

8. A method of generating timing control signals for a DC to DC power converter having first and second input MOSFET switches coupled to primary windings of an isolation transformer and two output MOSFET switches coupled to secondary windings of the isolation transformer, comprising:
   when a pulse modulated signal goes low at time t1:
      causing a first output signal to go low at time t1 for switching the first input MOSFET switch;
      causing a second output signal to go high at time t3 for switching the second input MOSFET switch;
      causing a third output signal to go low at time t2 for switching the first output MOSFET switch; and
      causing a fourth output signal to go high at time t2 for switching the second output MOSFET switch; and when the pulse modulated signal goes high at time t4:
  causing the first output signal to go high at time t7 for switching the first input MOSFET switch,
  causing the second output signal to go low at time t6 for switching the second input MOSFET switch;
  causing the third output signal to go high at time t5 for switching the first output MOSFET switch; and
  causing the fourth output signal to go low at time t8 for switching the second output MOSFET switch,
  wherein the times t1 through t8 occur in sequence.

9. A timing circuit for a lossless DC to DC power converter comprising:
  the DC to DC power converter comprising:
    a power converter input terminal;
    a power converter output terminal;
    an input inductor coupled between the power converter input terminal and an input node;
    an input MOSFET switch coupled between the input node and a first voltage reference;
    a complementary input MOSFET switch coupled between the input node and the first voltage reference;
    an output MOSFET switch coupled between an output node and a second voltage reference;
    an isolation transformer having first and second windings;
    a complementary output MOSFET switch coupled between the second winding and the second voltage reference;
    a series input capacitor coupled between the input node and the first winding;
    an output capacitor coupled between the power converter output terminal and the second voltage reference; and
    an output inductor coupled between the second winding and the power converter output terminal; and
  the timing control circuit comprising:
    a timing control input terminal for receiving a pulse width modulated signal from the DC to DC power converter that switches low at time t1 and high at time t4;
    a first output signal circuit responsive to the pulse width modulated signal and providing a first timing output signal that switches low at time t1 and high at time t7 to control the input MOSFET switch;
    a second output signal circuit responsive to the pulse width modulated signal and providing a second timing output signal that switches high at time t3 and low at time t6 to control the complementary input MOSFET switch;
    a third output signal circuit responsive to the pulse width modulated signal and providing a third timing output signal that switches low at time t2 and high at time t5 to control the output MOSFET switch; and
    a fourth output signal circuit responsive to the pulse width modulated signal and providing a fourth timing output signal that switches high at time t2 and low at time t8 to control the complementary output MOSFET switch.

10. The timing circuit of claim 9 wherein the times t1 through t8 occur in sequence.

11. The timing circuit of claim 9 wherein the first output signal circuit comprises:
  a first resistor coupled between the timing circuit input terminal and a first node;
  a first diode having a cathode connected to the timing control input terminal and an anode connected to the first node;
  a first capacitor coupled between the first node and the first voltage reference; and
  a first comparator having a positive input connected to the first node, a negative input connected to a third voltage reference, and an output providing the first timing output signal.

12. The timing circuit of claim 11 wherein the second output signal circuit comprises:
  a second resistor coupled between the timing control input terminal and a second node;
  a second diode having an anode connected to the timing control input terminal and a cathode connected to the second node;
  a second capacitor coupled between the second node and the first voltage reference; and
  a second comparator having a positive input connected to the second node and a negative input connected to the third voltage reference;
  a first inverter having an inverting input connected to an output of the second comparator;
  a third resistor coupled between the output of the first inverter and a third node;
  a third diode having an anode connected to the output of the first inverter and a cathode connected to the third node; and
  a third capacitor coupled between the third node and the first voltage reference; and
  a third comparator having a positive input connected to the third node, a negative input connected to the third voltage reference, and an output providing the second timing output signal.

13. The timing circuit of claim 12 wherein the third output signal circuit comprises:
  a fourth resistor coupled between the timing control input terminal and a fourth node;
  a fourth diode having a cathode connected to the timing control input terminal and an anode connected to the fourth node;
  a fourth capacitor coupled between the fourth node and a second voltage reference; and
  a fourth comparator having a non-inverting input coupled to the fourth node and a negative input connected to the third voltage reference;
  a fifth resistor coupled between an output of the fourth comparator and a fifth node;
  a fifth diode having an anode connected to the output of the fourth comparator and the fifth node;
  a fifth capacitor coupled between the fifth node and the second voltage reference; and
  a fifth comparator having a positive input connected to the fifth node, a negative input connected to the third voltage reference, and an output for providing the third timing signal.

14. The timing circuit of claim 13 wherein the second output signal circuit comprises:
  a sixth resistor coupled between the timing control input terminal and a sixth node;
  a sixth diode having an anode connected to the timing control input terminal and a cathode connected to the sixth node;
  a sixth capacitor coupled between the sixth node and the second voltage reference; and
  a sixth comparator having a positive input coupled to the sixth node and a negative input connected to the third voltage reference;
  a seventh resistor coupled between the output of the sixth comparator and a seventh node;

a seventh diode having a cathode connected to the output of the sixth comparator and an anode connected to the seventh node;

a seventh capacitor coupled between the seventh node and the second voltage reference; and a seventh comparator having a positive input connected to the node, and a negative input connected to the third voltage reference, for providing the fourth timing output signal.

15. The timing circuit of claim 14 wherein the times t1 through t8 occur in sequence.

16. The timing circuit of claim 14 wherein the resistances of the first through seventh resistors and the capacitances of the first through seventh capacitors comprise values that adjust the temporal occurrence of the first, second, third, and fourth timing output signals.

* * * * *